United States Patent [19]

Miwa

[11] Patent Number: 5,054,844

[45] Date of Patent: Oct. 8, 1991

[54] AERODYNAMIC MOTORCAR

[76] Inventor: Tsutomu Miwa, 3010-8, Sayamagaoka 1-chome, Tokorozawa-shi, Saitama, 359, Japan, 359

[21] Appl. No.: 569,483

[22] Filed: Aug. 20, 1990

Related U.S. Application Data

[60] Continuation of Ser. No. 440,450, Nov. 22, 1989, abandoned, which is a continuation of Ser. No. 162,305, Feb. 29, 1988, abandoned, which is a division of Ser. No. 926,412, Oct. 7, 1986, abandoned.

[30] Foreign Application Priority Data

Dec. 7, 1984 [JP] Japan .................................. 59-257479

[51] Int. Cl.$^5$ .............................................. B62D 35/00
[52] U.S. Cl. .................................. 296/198; 296/180.1; 296/180.5; 296/208; 296/185; 280/848
[58] Field of Search .................. 296/180.1, 180.5, 208, 296/185, 198; 180/68.1; 280/848, 849, 668

[56] References Cited

U.S. PATENT DOCUMENTS

| | | | |
|---|---|---|---|
| 1,871,396 | 8/1932 | Stalker | 296/180.1 |
| 2,725,944 | 12/1955 | Lee et al. | 296/180.1 X |
| 2,886,120 | 5/1959 | Broell | 180/68.1 |
| 2,888,274 | 5/1959 | Premo | 296/208 X |
| 3,064,747 | 11/1962 | Barenyi | 296/208 X |
| 3,618,998 | 11/1971 | Swauger | 296/61 |
| 3,776,587 | 12/1973 | Oxlade | 296/180.5 |
| 3,791,468 | 2/1974 | Bryan, Jr. | 296/180.1 X |
| 3,869,166 | 3/1975 | Burst et al. | 296/180.1 X |
| 3,917,332 | 11/1975 | Puleo | 296/901 X |
| 4,006,931 | 2/1977 | Groves | 296/180.3 |
| 4,029,350 | 6/1977 | Goupy et al. | 293/110 |
| 4,131,308 | 12/1978 | Holka et al. | 296/180.5 |
| 4,159,140 | 6/1979 | Chabot et al. | 296/180.5 |
| 4,379,582 | 4/1983 | Miwa | 296/1 S |
| 4,549,762 | 10/1985 | Burk et al. | 296/208 |
| 4,690,204 | 9/1987 | Reichel et al. | 180/68.1 |

FOREIGN PATENT DOCUMENTS

| | | | |
|---|---|---|---|
| 64274 | 2/1946 | Denmark . | |
| 912663 | 5/1954 | Fed. Rep. of Germany . | |
| 1138365 | 1/1957 | France | 180/68.1 |
| 500186 | 11/1954 | Italy . | |
| 503910 | 12/1954 | Italy . | |
| 503639 | 1/1956 | Italy | 180/68.1 |
| 623498 | 5/1949 | United Kingdom | 180/68.1 |
| 2076762 | 12/1981 | United Kingdom | 296/198 |

Primary Examiner—Dennis H. Pedder
Attorney, Agent, or Firm—Lowe, Price, Leblanc & Becker

[57] ABSTRACT

The present invention provides an automobile which offers air resistance and lift which are lower than those for a conventional automobile, yet which is hardly changed in its external appearance. The reducing means includes over each front wheel 19 an air passage 4 formed as a hollow 1 made by recessing a body panel located above the wheel, the air passage 4 having an air inlet 2 at its front and an air outlet 3 at its rear. Air current flows smoothly through the hollow 1 located above the front wheel to the air outlet 3 which is on the same level at or located at a higher position than the air inlet 2, thereby reducing air resistance and lift to levels which are lower than those for the conventional automobile. In one aspect of the invention, the air passage 4 is covered by a bonnet 16, other outer shell portions, and a pivotally secured reverse lift plate 5 or a reverse lift member 12 is included. The reverse lift plate 5 or the reverse lift member 12 is made flush with the surrounding outer shell and is provided in such a manner that it does not represent an unsightly appendage which would change the appearance of the conventional automobile. In another aspect of the invention comparable air passages and reverse lift members are provided over each of the rear wheels as well, to further reduce the air resistance and to improve the stability of the vehicle during motion and when exposed to side winds.

24 Claims, 8 Drawing Sheets

AERODYNAMIC MOTORCAR

This application is a continuation of application Ser. No. 07/440,450filed Nov. 22, 1989, abandoned, which is a continuation of application Ser. No. 07/162,305, filed Feb. 29, 1988, abandoned, which is a division of application Ser. No. 06/926,412 filed Oct. 7, 1986, abandoned.

FIELD OF THE INVENTION

The present invention relates to a system for improving the aerodynamic characteristics of an automobile, including reduction of both air resistance and lift, by providing the automobile with air passages above its wheels through which air passes from the front to the rear of the automobile, a part of the air passage being provided with a reverse lift member.

BACKGROUND OF THE PRIOR ART

It is known to decrease the air resistance and reduce the lift acting on an automotive vehicle by modifying the external form thereof. However, there is no prior art enabling an aerodynamic inner vehicle body to be incorporated within the outer or visible automobile body to reduce both air resistance and lift cause by the automotive wheels and the wheel space therefor (which can be the main barrier preventing reduction in the air resistance of the automobile).

The present invention resides in transforming the space within which a wheel moves up and down in a corresponding wheelwell into an air passage through which air can pass smoothly, and aims at the provision of an aerodynamically efficient automobile body having reduced air resistance and reduced lift.

DISCLOSURE OF THE INVENTION

The aerodynamic automobile of the present invention includes an air passage provided over the wheel through which a current of oncoming air passes smoothly from the front to the rear of the motorcar. The air passage has an air inlet and an air outlet. A part of the air outlet is provided with air guide plates or a reverse lift plate to reduce air resistance and to provide a reverse lift on the automobile. The reverse lift plate is preferably mounted in the air outlet to form part of the exterior outer shell, i.e., the visible outer body, to achieve a smooth external appearance of the automobile.

BRIEF DESCRIPTION OF THE DRAWINGS

FIGS. 1 to 6, apart from the lower half of FIG. 4, left half of FIG. 5 and left half of FIG. 6 which show a conventional automobile, are illustrations of a first embodiment of the present invention in which:

FIGS. 7 to 10 show a second embodiment of the present invention in which:

FIGS. 11 to 15 show a third embodiment of the present invention in which:

DESCRIPTION OF THE PREFERRED EMBODIMENTS

Embodiments of the present invention will be described with reference to the accompanying drawings.

Note that for clarity and convenience of reference, given that the described aspects of the invention may be used over either the front or the rear and the left or the right wheels of a conventional four-wheeled automobile, parts that are numbered 1, 2, 3, etc., for the front are respectively numbered 101, 102, 103, etc., for the rear.

Figure 1:
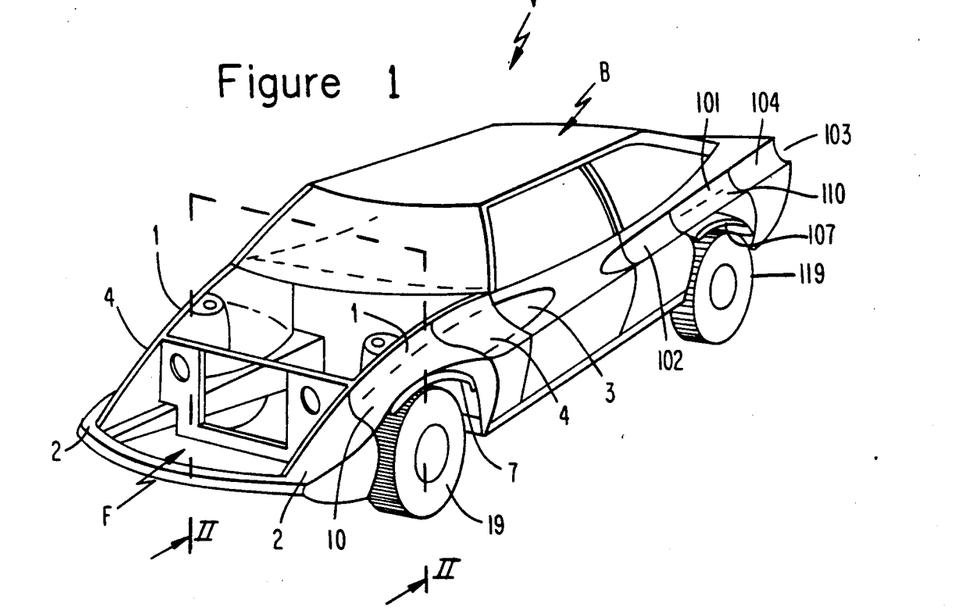
FIG. 1 is a perspective view of the body of an automobile to which the present invention is applied.

FIG. 1 is a perspective view of an aerodynamic automobile, illustrating a first embodiment of the present invention, with portions of the outer visible body structure, engine and ancillary elements omitted for simplicity.

As will be seen more fully below, the present invention is directed towards improvements in a vehicle V having a plurality of wheels 19 supporting a vehicle body structure including a vehicle body and frame F to which is mounted a visible vehicle body shell to which elements are added to define a vehicle exterior. See FIG. 3. Exemplary front wheel 19 is disposed with a corresponding wheel housing 6 located between the body frame F and vehicle body shell B. The improvement in one aspect of the invention comprises a wheel cover means 10 extending respectively within wheel housing 6, above each of the front wheels 19 and spaced to be close thereto. The wheel cover means 10 defines an air passage 4, in part by an upper surface 10a of wheel cover means 10 and extending in the longitudinal direction of the vehicle directly above the wheel 19. The passage 4 includes an air inlet 2 and an air outlet 3 respectively disposed forwardly and rearwardly of the associated wheel 19.

Figure 2:
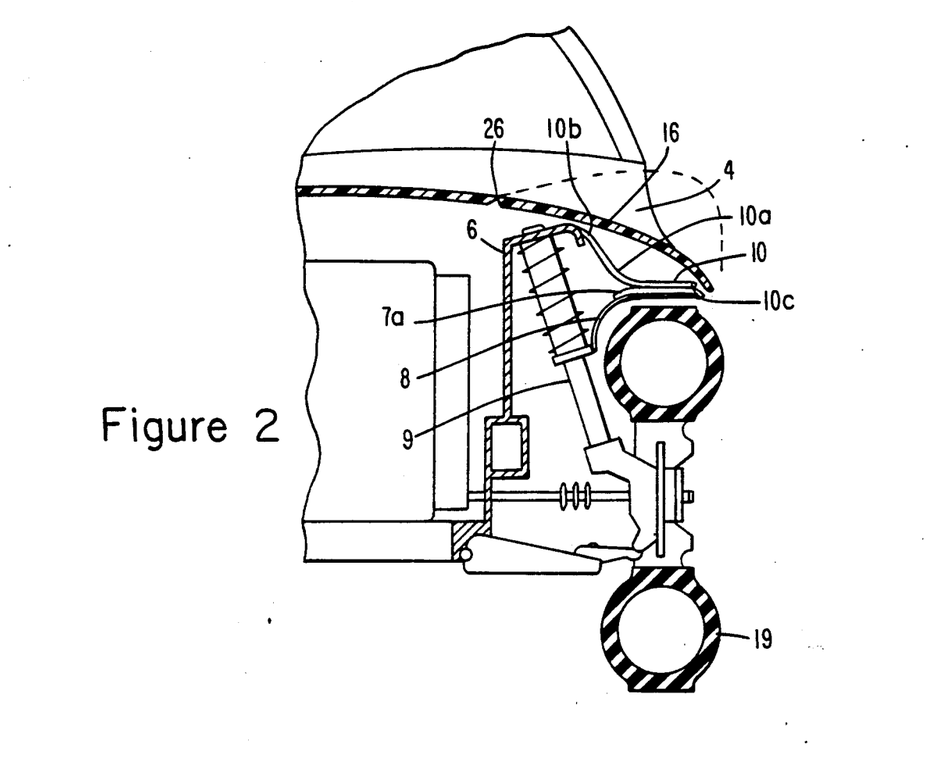
FIG. 2 is a section taken along the line II—II of FIG. 1.
Figure 13:
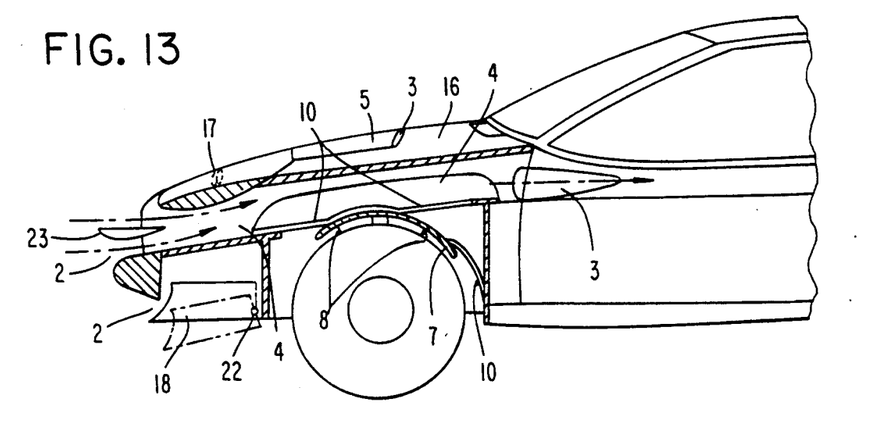
FIG. 13 is a side sectional view taken along the line XIII—XIII of FIG. 12.

As best depicted in FIGS. 2 and 13, the wheel cover means 10 is in the form of a thin sheet of resilient material, secured at one side portion 10b thereof to the housing 6, and, at another side portion 10c thereof overlying the wheel 19 connected to a thin plate-like interlocking member 7 extending above the wheel. One end of a stay 8 is connected to partially support the interlocking member 7, and the other end of stay 8 is connected to a spring member 9 mounted for vertical movement caused by a corresponding upward thrusting movement of the wheel. Close spacing (discussed infra) of the wheel cover means 10 relative to wheel 19, even during upward thrusting movement of wheel 19, is maintained by the related movement of spring member 9, stay 8 and hence the interlocking member 7, with the wheel cover means 10 resiliently deforming to remain directly above and close to wheel 19.

Similarly, over each of the rear wheels 119 there is formed a similar structure, comprising a wheel cover means 110 formed of a thin sheet of resilient material secured to the wheel housing at one side and supported at another side by as thing plate-like interlocking member 107 supported by a stay 108 connected to a spring member 109. See, for example, FIGS. 1 and 7. The detailed discussion of the essential structural features of this invention, and its operation and advantages, may be limited in the following to either the front or the rear of the automobile to avoid redundancy and for conciseness. Where it is clearly appropriate to focus on one or the other, clarity is provided by appropriate language and use of corresponding numerals to identify the various elements.

As illustrated in the drawing, a portion of the panel wheel housing of the inner vehicle body located above the wheel is recessed to allow a hollow 1 to be formed thereat. See FIGS. 1, 3 and 6. The height of the wheel housing panel can be made slightly larger than the height of the wheel by thus providing a hollow 1 in the wheel housing panel which encloses the wheel. In other words, the height of the wheel housing panel can be made far lower with respect to the top of wheel 19 than the height of a panel in a conventional automobile in which there is a large space above the wheel. This enables an air flow to pass horizontally immediately above the wheels through the hollow provided by recess 1 over the front wheel and 101 over the rear wheel.

At the front and the rear of the hollow 1, air inlet 2 and air outlet 3 are provided, with air passage 4 formed therebetween, thus enabling a portion of the current of oncoming air to flow smoothly a few centimeters above the wheel. Likewise, air passage 104 over the rear wheel has an entrance 102 and outlet 103. See FIG. 1.

A wheel cover 10 made of resilient material such as synthetic rubber or the like is provided to extend over, in front of, and at the rear of the front wheel 19 to separate the air current into two portions, flowing in the wheel-well and in the air passage 4, respectively. Comparable structure, with obvious shape differences is provided over the rear wheel on each side.

This allows a portion of the current of oncoming air flowing in the hollow 1 positioned immediately above the wheel 19 to be unaffected by turbulent flow generated within the wheel housing by rotation of the wheel. It is believed that flow through air passages 4, 104 takes the form of smooth or laminar flow.

In other words, in designing the upper half of an automobile body shell, except for the window area, it is possible in effect to narrow the front and rear portions thereof to a large degree, thus enabling the manufacture of an aerodynamic automobile body that experiences reduced wind resistance to its motion.

Referring to FIG. 2, which is a sectional view taken along the line II—II of FIG. 1 as seen from the front of the automobile, stay 8 is secured at its lower portion to a lower spring member 9 of the vehicle suspension system, and is mounted at an upper end to an upper interlocking member 7.

When the wheel 19 is thrust upwardly, the upper interlocking member 7 and stay 8 are pushed up by the lower spring member 9. However, the upper half of the wheel 19 remains spaced apart from and under the wheel cover 10 due to the flexing of the wheel cover 10 made of flexible material which is secured to the wheel housing panel 6 forwardly and rearwardly of the wheel 19.

If the outer body shell of a side panel 20 or a bonnet 16 of the automobile is made of a resilient material to cope with the upward thrusting of the upper interlocking member 7, it can be provided at a position as low as just several centimeters above the wheel 19. In such a case, it is not necessary to make the entire bonnet flexible, and only the bending portion 26 of the bonnet, for example, need be made of resilient material. See FIG. 2, for such an arrangement over the left front wheel of the automobile.

In FIG. 2, the dotted line representing the line of the bonnet or the side panel above the wheel 19 shows in cross-section the position of the outer body shell of a conventional automobile, the solid line indicating the structure according to the first embodiment of this invention.

Figure 3:
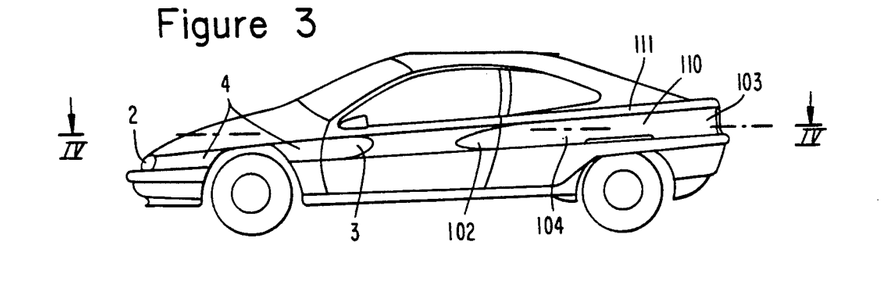
FIG. 3 is a side elevational view.

FIG. 3 is a side elevational view of the external form of a high performance automobile to which this invention is applied over the front and rear wheels. A long recessed portion is provided above each rear wheel in such a manner as to extend from the door to the rear of the automobile. The front of this recess forms the air inlet 102, whereas the recessed portion and the rearmost portion respectively represent the air passage 104 and the air outlet 103. Since the air flowing along the side surface of the outer body experiences a drop in pressure, the air current flowing around the recess and along the side surface of the automobile body readily flows into this recessed air passage 104, and flows out from the rearmost portion, i.e., out of the air outlet 103 where the ambient pressure is lowest.

The air current flowing in this rear recessed air passage 104 in this embodiment has a different configuration from that flowing over the conventional automobile when seen from above.

Figure 4:
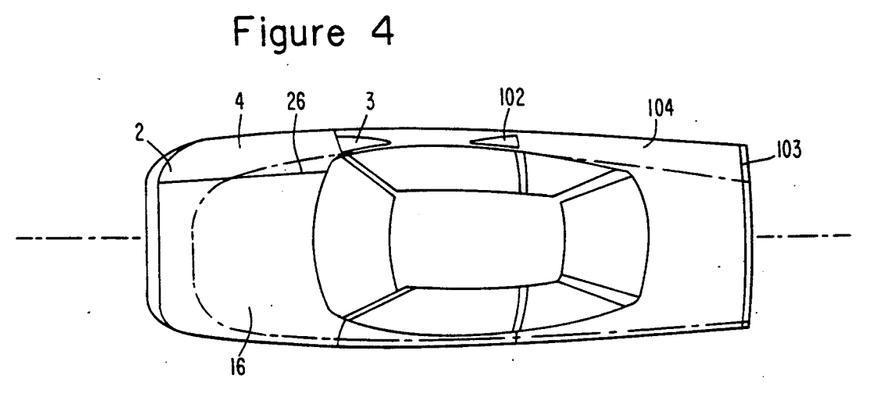
FIG. 4 is a top view.

FIG. 4 is a plan view of an automobile, in which the upper half thereof shows an automobile to which this invention is applied and the lower half relates to a conventional automobile.

The dotted line in FIG. 4 shows the configuration of the outer shell of the automobile body as seen from above which is taken along the line IV—IV of FIG. 3.

It is apparent that the configuration of the air current flowing along the outer shell of the side of the automobile body shown in the upper half would be quite different from that along the conventional automobile shown in the lower half.

In the side view of FIG. 3, the configuration of the air current along the automobile of the present invention may look the same as that along the conventional automobile. However, it becomes quite different from that of the known automobile with respect to the air passages 4, 104 formed in the respective front and rear recesses in the upper half of the automobile body as shown in FIG. 4 taken along the line III—III of FIG. 3.

More specifically, in the upper half of FIG. 4, the rear portion of the automobile body is seen as narrowed extensively by the recess provided over the rear wheel like that which is shown in FIG. 3.

Figure 5:
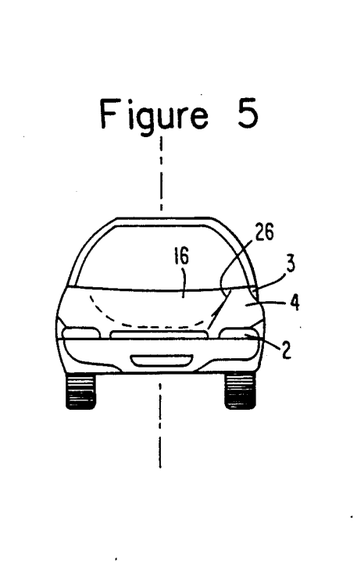
FIG. 5 is a front view.

FIG. 5 is a front view of an automobile, in which the right half illustrates an automobile to which the present invention is applied and which is shown in FIGS. 3 and 4, while the left half represents a conventional automobile.

In the right half of FIG. 5, the shoulder of the large-sized bonnet which extends above the front wheel is hollowed out, whereas in the left half the bonnet is rounded because of the space incorporated therein in which the wheel moves up and down.

The configuration of the air flow through the very low passage provided above the front wheel in the automobile of the present invention is quite different from that of the conventional automobile in which the air passes over a large space occupied by the suspension system of the front wheel.

Figure 6:
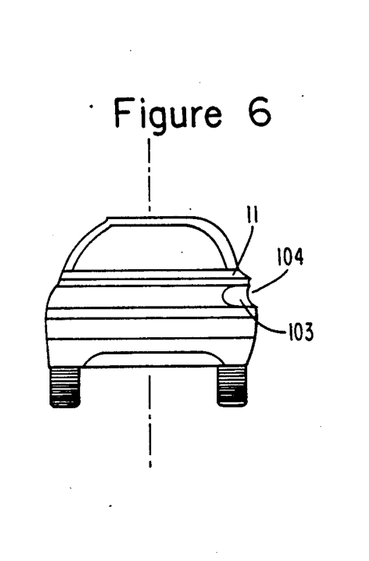
FIG. 6 is a rear view.

FIG. 6 is a rear view of an automobile, in which the right half illustrates the automobile of the present invention and the left half shows the conventional automobile. In the right half of FIG. 6, the air outlet 103, i.e., the rear end of the air passage 104 which represents a recess on the side of the automobile body allows the aerodynamic automobile body to be made narrower at its rear end. The portion overhanging the air outlet 103 which is represented by the recess on the rear of the automobile body constitutes a rear wing 111. This forms the upper surface of the air passage 104. A shown in FIG. 3, the rear wing 111 gently slopes upward from above the rear wheel toward the rear of the automobile.

In consequence, the rear wing 111 causes reverse lift to be generated by directing the current of oncoming air slightly upward and causing it to flow out in a obliquely upper and rearward direction, thereby increasing the tendency of the rear wheels to stay on the ground.

The rear wing 111 also prevents the air stream flowing down over the roof and the air stream flowing up by the sides of the automobile body from interfering with each other. In the conventional automobile, the rear of the car body is sucked backward by suction due to a von Karman vortex which is generated as a result of interference between these air currents, thereby increasing the air resistance experienced by the automobile. The occurrence of the von Karman vortex can be prevented by this rear wing 111 which acts to separate these two air currents.

A rear portion of the rear wing 11 on each side may be cut off and be pivotably supported so as to be transformed into a reverse lift plate 105 which may pivot during motion of the automobile so that it has a lowered front end and a raised rear end.

Figure 8:
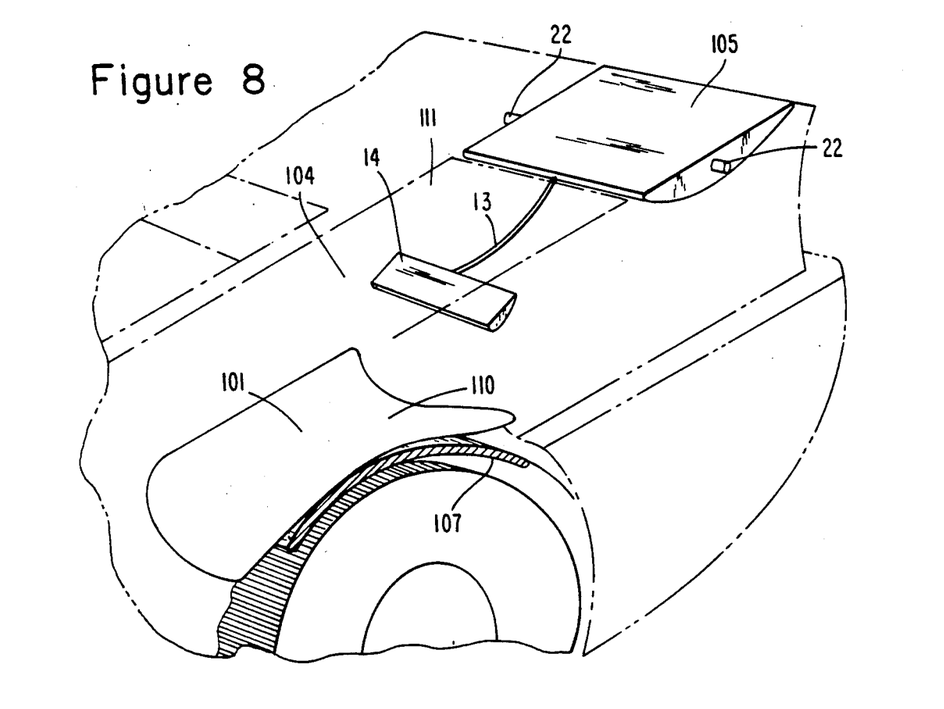
FIG. 8 is a perspective view showing the interior without the outer shell.
Figure 9:
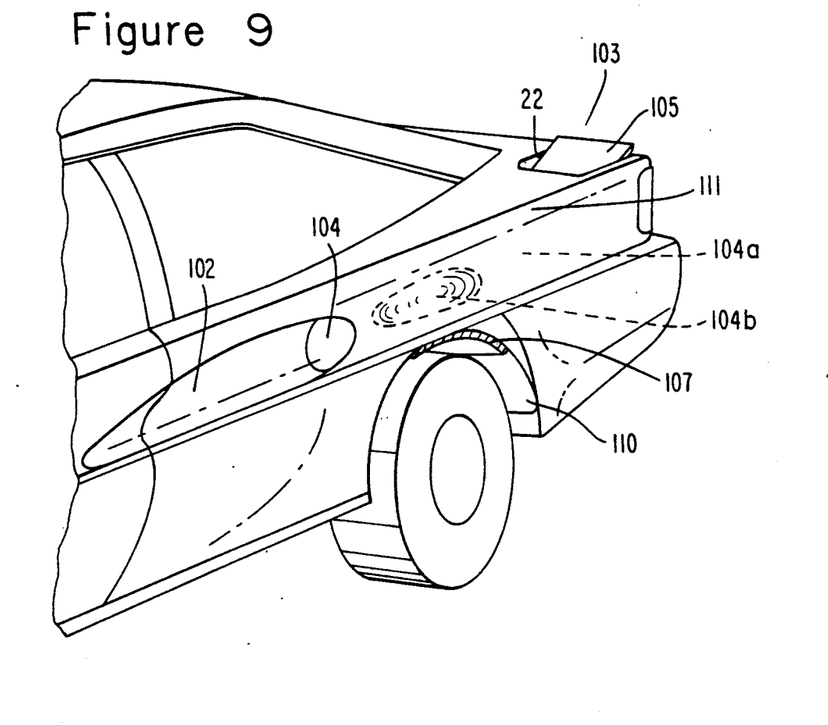
FIG. 9 is a perspective view of the external view.

FIGS. 8 and 9 show an opening/closing mechanism of the reverse lift plate 105 which utilizes air pressure for its operation.

Figure 7:
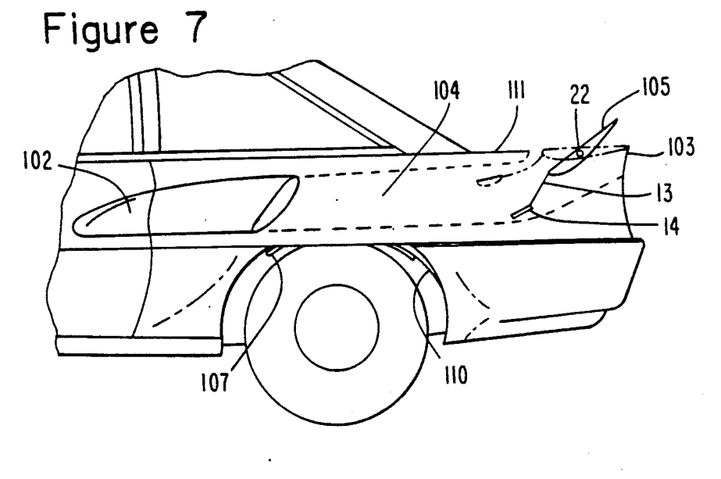
FIG. 7 is a side elevational view.

FIG. 7 is a side view of the reverse lift plate 5 movably supported on the rear of the rear wing 111. The solid line shows reverse lift plate 105 in a state wherein it is "opened", while the dotted line shows a "closed" position of the same reverse lift plate 105.

FIG. 8 is an enlarged perspective view of the reverse lift plate 105. When it is closed, the upper surface of the reverse lift plate 105 is flush with the rear wing 111, thus ensuring that the plate 105 does not represent an unsightly appendage which would harm the appearance of the automobile.

Note that, in conventional terms as used in the fluid mechanics arts, each reverse lift plate has a "leading edge portion" and a "trailing edge portion".

As shown in FIGS. 7 and 8 a reverse lift guide 14 is secured to the distal end of a guide stay 13 which protrudes downwardly from the front end of the reverse lift plate 105 in a slanting fashion, the reverse lift guide 14 being disposed to be slanted such that its front edge is always positioned lower than the rear edge.

As the amount of air flowing through the air passage 104 increases, i.e., when the automobile is in forward motion, the reverse lift effect acting on the reverse lift guide 14 becomes larger than the force of gravity, or the force of a spring (not shown), which normally acts to keep the reverse lift plate 105 flat in its "closed" state.

In consequence, the reverse lift guide 14 is lowered, and the reverse lift plate 105 is raised at its rear end, thereby causing the air current passing over it to be directed upward and the reverse lift to be increased. As the reverse lift guide 14 is lowered down to the bottom surface of the air passage 104, the angle of inclination made by air flow at the rear end of the air passage 104 relative to its bottom surface becomes large, causing the air to flow further upward and the reverse lift effect experienced by the automobile to be further increased.

The automobile will have a tendency to lean toward the downwind side and be raised at the upwind side when subjected to a strong side wind and will also lean when making a turn. This undesirable tendency to lean can be prevented to some extent by the action of the reverse lift acting on the reverse lift plate 105 in proportion to the amount of air flowing through the air passage 104.

The automobile body receives more air flow on its windward side when it receives the upwind side or on the side which represents the inner side in terms of a turning direction when making a turn, causing a larger amount of air to flow through the air passage 104 on that side.

This causes the air passage 104 located at the windward side or the inner side to be affected by a larger amount of reverse lift than that applied to the other side.

In consequence, the windward side or the inner side of the automobile body which is easily raised is pushed downward by the action of the reverse lift, thus ensuring safe driving.

With this reverse lift guide 14 provided, the side of the air passage 104 must be covered by the outer shell, thereby making the passage 104 like an open cylinder.

FIG. 9 is a perspective view of the embodiment in which the side of the air passage 104 is covered so that the guide stay 13 and the reverse lift guide 14 are hidden by the outer shell.

In the embodiment shown in FIG. 9, the air inlet 102 provided on the side surface of the automobile body looks like the air inlet for the radiator of a known high-powered automobile in which the engine is located near the rear wheels., and it does not harm the appearance of the automobile.

In the automobile of this embodiment, however, the rear of the inner body presented to the wind is substantially reduced, thereby constituting an aerodynamic body which is in effect smaller than the visible body of the automobile. Only the visible automobile body which encloses the inner automobile body with an aerodynamic design is similar to that of the known automobile.

Figure 10:
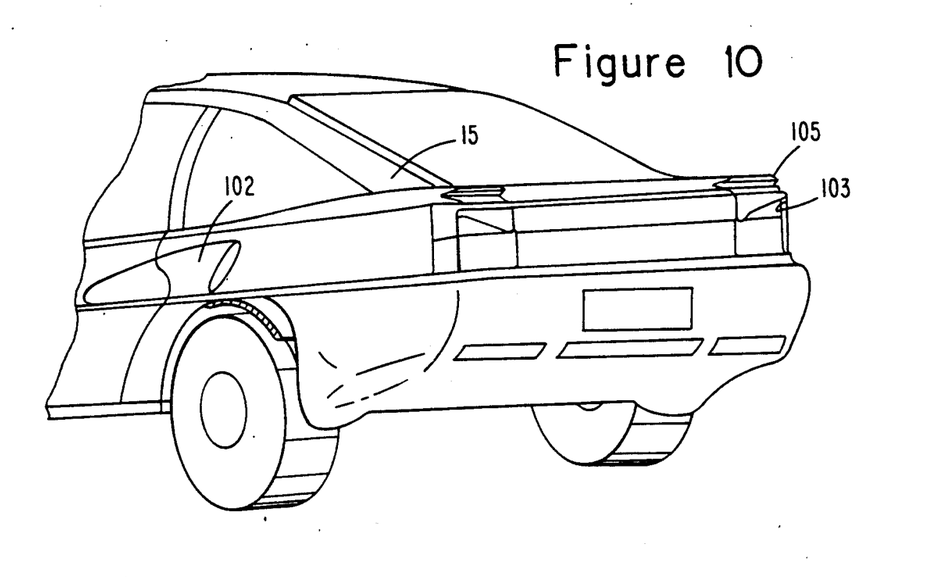
FIG. 10 is a perspective view of the rear.

FIG. 10 is a perspective view of the rear of the embodiment shown in FIG. 9. The rear of the aerodynamic inner automobile body, which is constituted by the inner surfaces of the air passages 104, is narrowed extensively, the narrowing starting close to the central portion of the automobile body, thereby reducing the air resistance.

The visible automobile body including the rear wing 111, however, looks the same as that of the known automobile.

In the automobile of this embodiment, the air passage 104 is provided by utilizing the space between the rear wheel housing and the trunk compartment. This makes the capacity of the trunk compartment smaller. However, even in the trunk compartment of the known automobile the portion of the trunk compartment into which the wheel housing extends and the portion to the rear thereof are seldom used. In this invention, since the air passage 104 is provided in that part of the trunk compartment which is least used, it should not lead to any inconvenience. The inner wall of the automobile trunk, except for that portion thereof which covers the space occupied by elements of the suspension system, may be made of a resilient material 104a, so that, if a large amount of luggage is carried, the air passage 104 may be closed as indicated at 104b.

Figure 11:
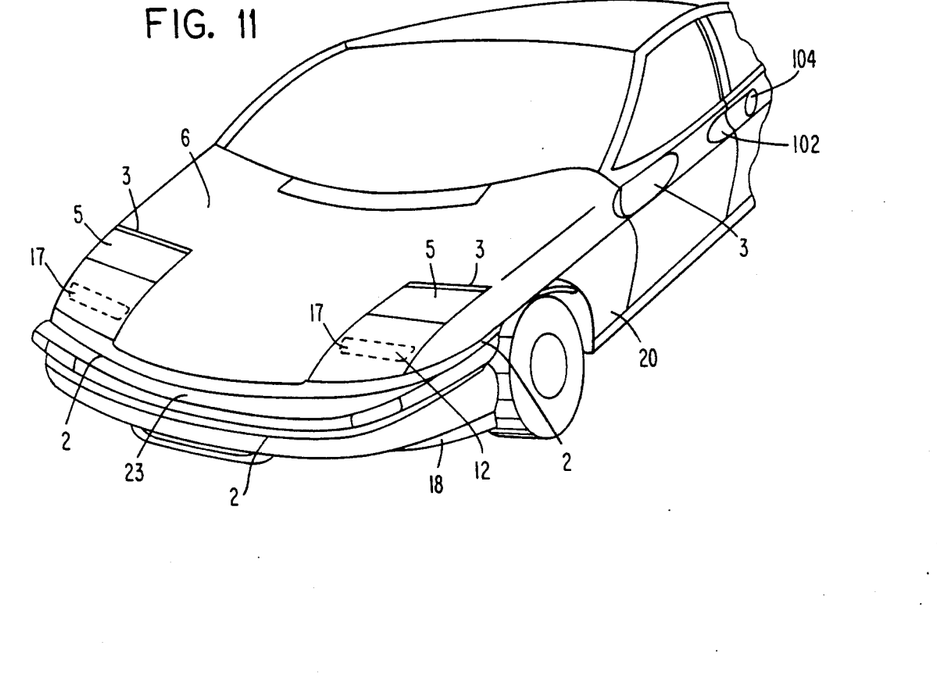
FIG. 11 is a perspective view.

FIGS. 11 to 15 illustrate a third embodiment of the present invention, of which FIG. 11 is a perspective view of an aerodynamic automobile in which a long air inlet 2 is provided on each side of the front of the automobile body by utilizing the portion where the bonnet 16 and the side panel 20 meet in such a manner as to extend from the front to the side of the automobile body. The reverse lift plate 5 is pivotably supported at the air outlet 3 provided on the bonnet 16. The long air passage 4 is provided on each side under the bonnet 16, thereby constituting an aerodynamic inner body which is smaller in size and which is hidden within the outer or visible body. A recess is provided at the front of the door to form the air outlet 3 on the side of the automobile body between the rear ends of the bonnet 16 and the side panel 20. Direction indicator and parking lights 24 and 25 are provided beneath hood 16.

Figure 12:
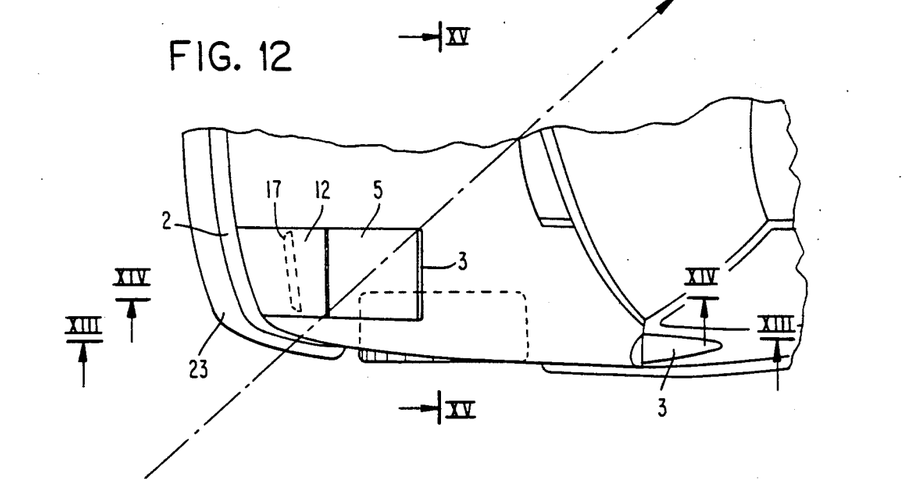
FIG. 12 is a top view.

FIG. 12 is a top view of the left half of the embodiment shown in FIG. 11, showing how the large-sized bonnet 16, the air outlet 3, the front reverse lift plate 5 and the front wheel are positioned relative to each other. The automobile body presented to the wind is extensively hollowed out in front of the portion thereof where the suspension space for the front wheel is positioned, so as to provide room for the air passage 4.

FIG. 13 is a side sectional view taken along the line XIII—XIII of FIG. 12 which runs through the center of the wheel in the longitudinal direction, showing the air passage provided above and on the outer side of the wheel.

In this embodiment, the air flow formed when the automobile is running straight ahead flows in along the upper and lower surfaces of a reverse lift bumper 23 positioned above a main bumper 27, passes through the air passage 4 located above and close to the wheel 19, and flows out from the air outlet 3 provided at the front of the door to the side of the automobile body.

Figure 14:
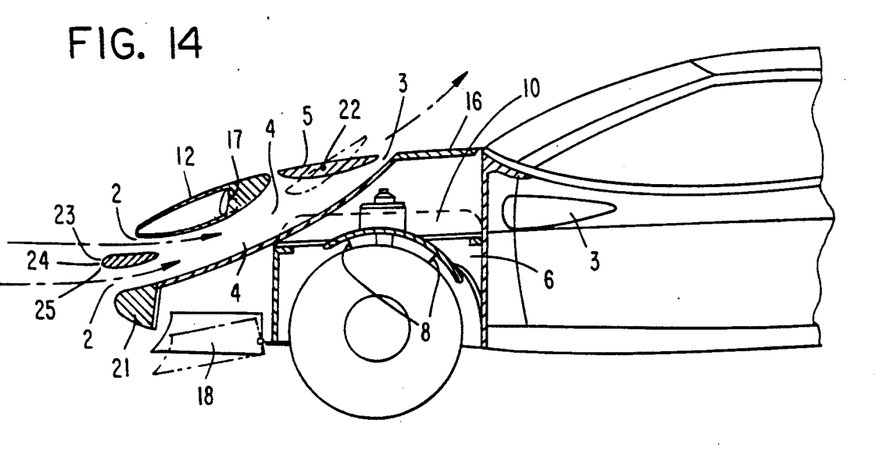
FIG. 14 is a side sectional view taken along the XIV—XIV of FIG. 12.

FIG. 14 is a side sectional view taken along the line XIV—XIV of FIG. 12, showing the air passage 4 provided above and at the inner side of the wheel.

Similar to the flow shown in FIG. 13, the air stream flows into the air passage 4 along the upper and lower surfaces of the reverse lift bumper 23 while generating reverse lift, since the rate of flow at the upper surface is smaller than that at the lower surface and the static pressure at its upper surface is larger than that at its lower surface.

Above this air stream, another air stream flows into the air passage 4 along the upper and lower surfaces of a reverse lift member 12 in which headlight 17 is incorporated. The air stream which passes along the lower surface of this headlight 17 flows out over the bonnet 14, while lowering the front end of the reverse lift plate 5 pivotally secured at the air outlet 3 on the bonnet and raising the rear end thereof. The air stream which flows along the upper surfaces of the reverse lift member 12 and the reverse lift plate 5 flows at a smaller speed and has a greater static pressure than that flowing along the lower surfaces, thereby causing the front ends of the reverse lift member 12 and the reverse lift plate 5 to be lowered further than their rear ends and causing reverse lift to act on the reverse lift member 12 and the reverse lift plate 5. In consequence, the automobile body is pushed downward, ensuring safe running.

The reverse lift generated by this reverse lift system does not always act equally on the right and left sides of the automobile body. When the automobile is subjected to a strong side wind or when making a turn, the windward side of the automobile body receives a larger wind pressure than the downwind side, causing the automobile body to lean with its downwind side lower and thereby makes the running unstable. In the automobile of this embodiment, air flows only in the air passage 4 located at the windward side, generating a large reverse lift. In consequence, the tendency to stay on the ground is increased only with respect to the wheels located on the side which is apt to be raised, thereby ensuring safe driving.

The air passage 4 shown in FIG. 14 is provided above the wheel so that it avoids the suspension system for the front wheel and the space which it occupies.

Figure 15:
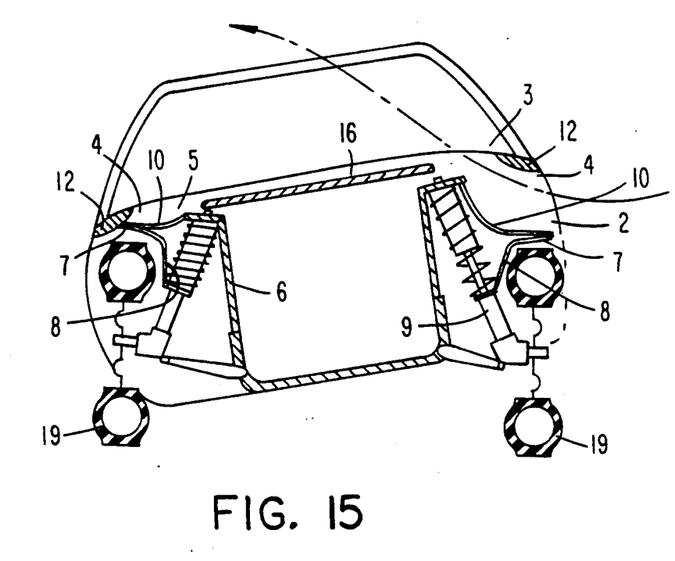
FIG. 15 is a front sectional view taken along the line XV—XV of FIG. 12.

FIG. 15 is a section taken along the line XV—XV of FIG. 12 and seen from its front side, showing an automobile making a left turn with wind blowing toward it obliquely from the front left hand side as shown by the dotted line of FIG. 12. When the automobile body leans over by virtue of the centrifugal force generated by the action of turning and the wheel 19 is simultaneously thrust upward into its wheelwell, the upper interlocking member 7 secured to the lower spring member 9 is raised, and the wheel cover 10 is also raised, thereby almost closing the air passage 4 located on the outer side in terms of the turning direction. Since the air passage 4 is located at the outer side and is thus closed, almost no reverse lift is generated.

In consequence, a large reverse lift acts only on the windward side, and this can to some extent prevent the automobile from leaning toward the downwind side, this tendency being caused by the inertia force generated at the time of making a turn.

Figure 16:
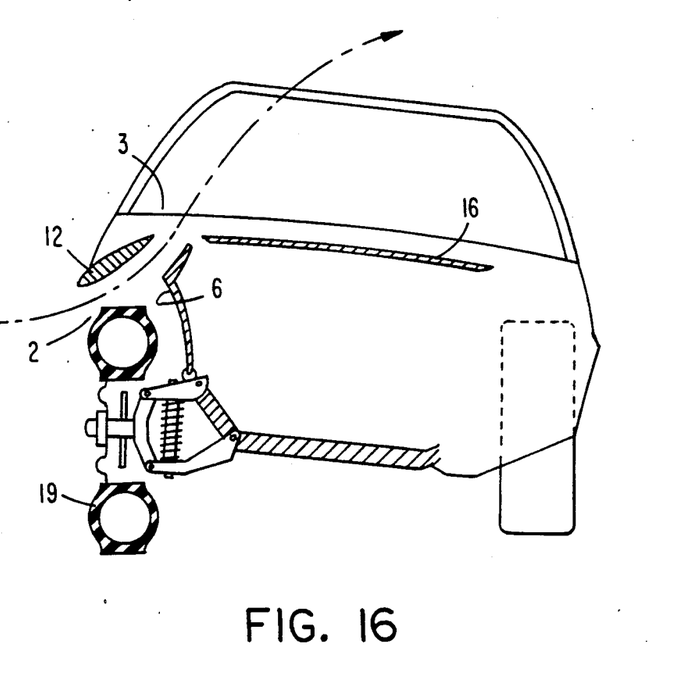
FIG. 16 is a front sectional view taken along the front wheel shaft, showing a fourth embodiment of the present invention.

FIG. 16 is a front and sectional view of a fourth embodiment of the present invention. In this embodiment, the front wing constitutes the reverse lift member 12. The wheel cover 10, the upper interlocking member 7 and the upper and lower stays 8 are not provided. If the suspension system is not located immediately under the bonnet 16, the air outlet 3 can be provided at any position on the bonnet 16.

In this embodiment, the air passage 4 located at the outer side in terms of the turning direction becomes closed when the automobile makes a turn. However, smaller amount of reverse lift occurs on the inner side, because smooth air flow is not available without the wheel cover 10.

In the fourth embodiment, any type of suspension system may be employed. This can be carried out with the same level of production cost as with a conventional automobile.

Figure 17:
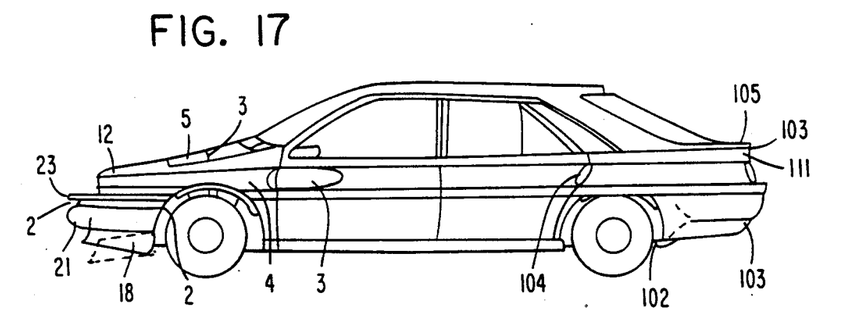
FIG. 17 is a side elevational view of a fifth embodiment of the present invention.
Figure 18:
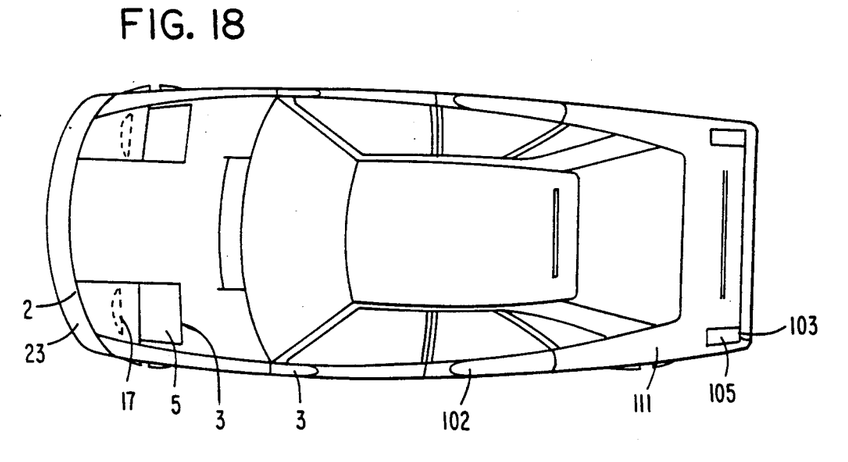
FIG. 18 is a top view of the automobile of FIG. 17.

FIG. 17 is a side elevational view of a fifth embodiment of the present invention, showing a 4-door sedan to which this invention is applied. FIG. 18 is a top view thereof.

The surface area of the automobile body with which the air current makes contact can be increased by several percent by means of the air passages 4 provided at various positions within the automobile body. The resistance caused by the friction of air is correspondingly increased. However, the frictional drag occupies only 5 to 7 percent of the air resistance occurring on the automobile, and the remaining 95 to 93 percent represents the profile drag.

In this invention, it is possible to reduce to a great degree the profile drag which normally occupies 95 to 97 percent of the air resistance by the provision of an aerodynamic automobile body which is narrower at its front and rear portions. The reduction in profile drag is far greater than the increase in frictional drag.

As a whole, the air resistance generated on the automobile can be greatly reduced with the aerodynamically smaller automobile body of this invention.

It has heretofore been known to reduce the size of wheels and the space occupied by the suspension system and thereby to make the front and rear of the automobile body narrower in order to reduce air resistance.

In this invention, it is possible to employ a large-sized wheel and to provide a large space for the suspension system in an aerodynamic automobile body which is narrower at its front and rear ends.

The fact that large-sized wheels and a larger space for the suspension system are allowed leads to an increased tendency for the wheels to stay on the ground and allows for a comfortable ride. Also, stable running is made possible by the reverse lift generated when the automobile is subjected to a side wind or when it makes a turn.

INDUSTRIAL APPLICABILITY

As will be understood from the foregoing description, the aerodynamic automobile of the present invention makes it possible for fuel cost to be cut by reducing the air resistance experienced by the automobile. Comparable benefits may similarly be realized in other road vehicles by logical application of this invention in obvious manner. Stable driving is also ensured by increasing reverse lift when the automobile is running at high-speeds or is making a turn. These effects can be realized without modification of the essentially rectangular external form of the automobile body which thus looks the same as that of a conventional automobile, allowing the present invention to be applied to ordinary passenger automobiles.

Automobiles have previously been aerodynamically improved. However, the main barrier to achieving reductions in air resistance represents the wheels and the space for the suspension system, as well as the fixed idea about the appearance of an automobile body which is held by ordinary people. The present invention makes it possible to provide an aerodynamically ideal motorcar without changing the external form of the conventional automobile.

The present invention can be carried out at a low production cost, since it does not employ any greater proportion of expensive outer shell than does the conventional automobile.

In this disclosure, there are shown and described only the preferred embodiments of the invention, but it is to be understood that the invention is capable of use in various other combinations and environments and is capable of changes or modifications within the scope of the inventive concept as expressed herein.

What is claimed is:

1. In a vehicle having a plurality of front and rear wheels supporting a vehicle body frame to which is mounted a body shell defining a vehicle exterior, each wheel being disposed within a wheel housing defined between the vehicle body frame and the body shell, the improvement comprising:
   a wheel cover means extending within at least one of the housings above the corresponding wheel therein,
   wherein said wheel cover means defines an air passage established in part by an upper surface of the wheel cover means and extending in a longitudinal direction of the vehicle directly above the wheel, said air passage including an air inlet and an air outlet respectively disposed forwardly and rearwardly of the associated wheel,
   said wheel cover means comprising a thin sheet of a flexible and resilient material secured at one portion thereof to the wheel housing and at another portion to an element supported by a spring support means capable of upward and downward movement related to movement of said corresponding wheel rotatably connected to said spring support,
   said air passage thereby having an inlet and an outlet and a cross-section that varies with upward and downward movement of the corresponding wheel, transmitted via said spring support means and element, which causes a deformation of the flexible and resilient sheet.

2. The vehicle according to claim 1, wherein:
   a portion of said body shell located over and around said air passage is made of a resilient material.

3. The vehicle according to claim 1, wherein:
   said wheel cover means separates an air current flowing longitudinally of said vehicle during motion thereof into two portions, a first portion flowing beneath the wheel cover means and around the wheel in turbulent manner and a second portion flowing above the wheel cover means in said air passage in a relatively less turbulent manner, whereby an associated wind resistance force on the vehicle is reduced.

4. The vehicle according to claim 1, wherein:
   said wheel housing is defined by a panel extending within the body shell to enclose said corresponding wheel,
   said wheel cover means being secured to the panel.

5. The vehicle according to claim 3, wherein:
   said wheel housing is defined by a panel extending with respect to the body shell to partially enclose said corresponding wheel,
   said wheel cover means being secured to the panel.

6. The vehicle according to claim 1, further comprising:
   a reverse lift plate, having a leading edge portion and a trailing edge portion, pivotably secured to an inner surface of said air passage,
   whereby said reverse lift plate has an operational position in which said trailing edge portion thereof is disposed higher than said leading edge portion thereof, said disposition causing the air flow through passage to generate a downward force on said reverse lift plate.

7. The vehicle according to claim 6, wherein:
   said reverse lift plate has an exterior surface movable into a rest position which is substantially contiguous with an adjacent outer surface portion of the body shell.

8. The vehicle according to claim 1, wherein:
a portion of the air passage extends along a trunk compartment of the vehicle and comprises a resilient material that is deformable when luggage in the trunk compartment is placed thereagainst.

9. The vehicle according to claim 2, wherein:
a portion of the air passage extends along a trunk compartment of the vehicle and comprises a resilient material that is deformable when luggage in the trunk compartment is placed thereagainst.

10. The vehicle according to claim 1, wherein:
said vehicle body shell in conjunction with said air passage defines an inner aerodynamic car body located inwardly of the vehicle exterior whereby conveyance of a relatively smooth flow of air is obtained past said inner aerodynamic body and an air resistance force experienced by said vehicle is reduced.

11. The vehicle according to claim 10, wherein:
said air passage defines a rear portion of the aerodynamic car body, which rear portion tapers in the rearward direction of the vehicle.

12. The vehicle according to claim 1, wherein:
said air passage is separated from said corresponding wheels by the wheel cover means, and an upper extend of said air passage is defined by a portion of said body shell.

13. The vehicle according to claim 1, further comprising:
a reverse lift plate pivotably mounted to said air passage proximate said air outlet of said air passage.

14. The vehicle according to claim 5, further comprising:
a rear wing provided on said body shell to form a rear portion of said air passage.

15. The vehicle according to claim 14, wherein:
said rear wing slopes upwardly from a point above a rear wheel of said vehicle toward the rear of the vehicle, said rear wing thereby generating a reverse lift during forward motion of the vehicle.

16. The vehicle according to claim 14, wherein:
a rear portion of said rear wing is pivotably supported to define a rear reverse lift plate.

17. The vehicle according to claim 6, wherein:
said air passage is substantially covered by said body shell, whereby a guide stay and said reverse lift plate attached there are disposed within said air passage and are hidden from view.

18. The vehicle according to claim 1, wherein:
said body shell comprises a hood and an adjoining side panel, said air passage being located at the front of the vehicle and extending beneath said hood, an air outlet being provided proximate a front door of the vehicle.

19. The vehicle according to claim 18, further comprising:
a second air outlet formed in said vehicle hood to communicate with an upper surface thereof.

20. The vehicle according to claim 18, further comprising:
a reverse lift bumper disposed within said air inlet of said air passage, said reverse lift bumper being positioned above a main bumper of the vehicle.

21. The vehicle according to claim 20, further comprising:
a reverse lift member positioned above said reverse lift bumper;
a headlight mounted within said reverse lift member; and
a reverse lift plate pivotably secured within a second air outlet of said air passage, said second air outlet being formed in said hood.

22. The vehicle according to claim 21, wherein:
said reverse lift member has an outer surface formed to be flush with adjacent portions of said body shell.

23. The vehicle according to claim 1, wherein:
said air passage has a substantially straight longitudinal axis, and said air passage along substantially its entire length defines a non-tortuous passage to facilitate smooth flow of air therethrough.

24. The vehicle according to claim 1, wherein:
said air passage has side walls formed to curve a corresponding flow path of air flowing therethrough upwardly in the rearward direction with respect to said vehicle, to thereby reduce a lift force on said vehicle during its motion.

* * * * *